United States Patent [19]

Abrams et al.

[11] Patent Number: 5,012,941
[45] Date of Patent: May 7, 1991

[54] TAMPER-PROOF CONTAINER AND CAP ASSEMBLY

[75] Inventors: Robert S. Abrams, Albany; H. Carl Smith, Fultonville, both of N.Y.

[73] Assignee: Robert S. Abrams, Albany, N.Y.

[21] Appl. No.: 464,417

[22] Filed: Jan. 12, 1990

[51] Int. Cl.⁵ ............................................. B65D 55/06
[52] U.S. Cl. ................................................. 215/250
[58] Field of Search ............... 215/306, 250, 273, 291; 220/375, 265, 315

[56] References Cited

U.S. PATENT DOCUMENTS

| | | | |
|---|---|---|---|
| 218,719 | 8/1879 | Doyle | 215/306 |
| 1,690,853 | 11/1928 | Behrman | 292/318 |
| 2,772,014 | 11/1956 | Clark . | |
| 3,265,426 | 8/1966 | Brooks et al. | 292/307 |
| 3,416,688 | 12/1968 | Fanning | 215/306 |
| 3,510,021 | 5/1970 | Silver . | |
| 3,556,575 | 1/1971 | Farkas | 292/318 X |
| 3,994,519 | 11/1976 | Williams | 292/307 X |
| 4,271,972 | 6/1981 | Thor | 215/253 X |
| 4,276,988 | 7/1981 | Kimm et al. | 215/253 X |
| 4,339,056 | 7/1982 | Berkstresser et al. | 220/375 |
| 4,537,432 | 8/1985 | Meeks | 292/318 |
| 4,658,955 | 4/1987 | Eichner | 206/307 |
| 4,811,865 | 3/1989 | Mueller, Jr. et al. | 215/250 X |
| 4,812,116 | 3/1989 | Abrams | 425/547 |
| 4,896,780 | 1/1990 | Jessop et al. | 215/306 X |

FOREIGN PATENT DOCUMENTS 515115  11/1952  Belgium ............................. 215/306

Primary Examiner—Donald F. Norton
Attorney, Agent, or Firm—Burns, Doane, Swecker & Mathis

[57] ABSTRACT

A tamper-proof container and cap assembly includes apertured flanges disposed on the container and cap, the apertures of which become substantially aligned when the cap is inserted onto the container. Integrally molded with one of the flanges is a locking strip designed for one-way passage through the aligned holes, whereby removal of the strip is possible only by permanent destruction thereof. Structure may be provided for preventing relative lateral movement between the flanges.

22 Claims, 2 Drawing Sheets

TAMPER-PROOF CONTAINER AND CAP ASSEMBLY

BACKGROUND AND OBJECTS OF THE INVENTION

The present invention relates to tamper-proof container and cap assemblies, such as molded plastic vials.

It is desirable in certain instances to provide a container to which access can be gained only by producing visible evidence that the container has been opened. Such a container would be useful in the transportation and storage of liquid specimens for example, to ensure the integrity of the specimen. The integrity of the specimen in the vial is becoming increasingly important in the dairy industry and for drug testing. It is important to ensure the so-called "guaranteed chain of custody" of the container contents.

Various expedients have been heretofore proposed to achieve such a result. One proposal is disclosed in U.S. Pat. No. 3,556,575 in which a string seal in the form of an elongated strip possesses conical teeth and an apertured head at one end of the strip. The strip can be inserted into a member to be sealed and then a tail end of the strip is inserted through the apertured head. The strip is pulled through the head until at least one tooth, formed of an elastic material, squeezes through the aperture. That tooth cannot pass back through the aperture without being permanently destroyed and thereby provides visible evidence of tampering. Such an arrangement, however, involves certain shortcomings, including the possibility that a person could break the original strip and then substitute a replacement strip after tampering with the container contents.

Furthermore, it is necessary that a user carry a supply of such strips for use when necessary. If the strips are forgotten or mislaid, a security lapse relating to the contents becomes possible.

Therefore, it is desirable to provide a tamper-proof container/cap assembly which ensures a greater degree of integrity of the container contents and which eliminates the need for a user to carry a supply of string seals.

It is further desirable to provide a tamper-proof container/cap assembly which is relatively inexpensive to manufacture and easy to use.

SUMMARY OF THE INVENTION

The present invention involves a tamper-proof container and cap. The container includes a first flange including a first through-hole. The cap includes a second flange having a second through-hole. The second flange is arranged to overlie the first flange when the cap is inserted onto a rim of the container. One of the container and cap is molded of plastic and includes an integrally molded strip extending freely from a fixed location adjacent the through-holes. The strip is of sufficient flexibility and length to enable the strip to be inserted through the holes while remaining attached to the one of the container and cap to which it is integrally molded. The strip includes portions configured for one-way passage through the through-holes, whereby the removal of the strip is possible only by permanent destruction thereof.

Preferably, the container and cap are integrally molded in one piece to form an integral hinge therebetween. It is also preferred that the strip be integrally molded with the container.

The second flange on the cap preferably extends past the first flange to define a thumb tab which facilitates removal of the cap.

One of the flanges preferably includes a post arrangement for engaging the other flange in a manner opposing relative movement between the flanges in a direction laterally of the axes of the through-holes.

BRIEF DESCRIPTION OF THE DRAWINGS

The objects and advantages of the invention will become apparent from the following detailed description of preferred embodiments thereof in connection with the accompanying drawings in which like numerals designate like elements, and in which.

DETAILED DESCRIPTION OF PREFERRED EMBODIMENTS OF THE INVENTION

Figure 1:
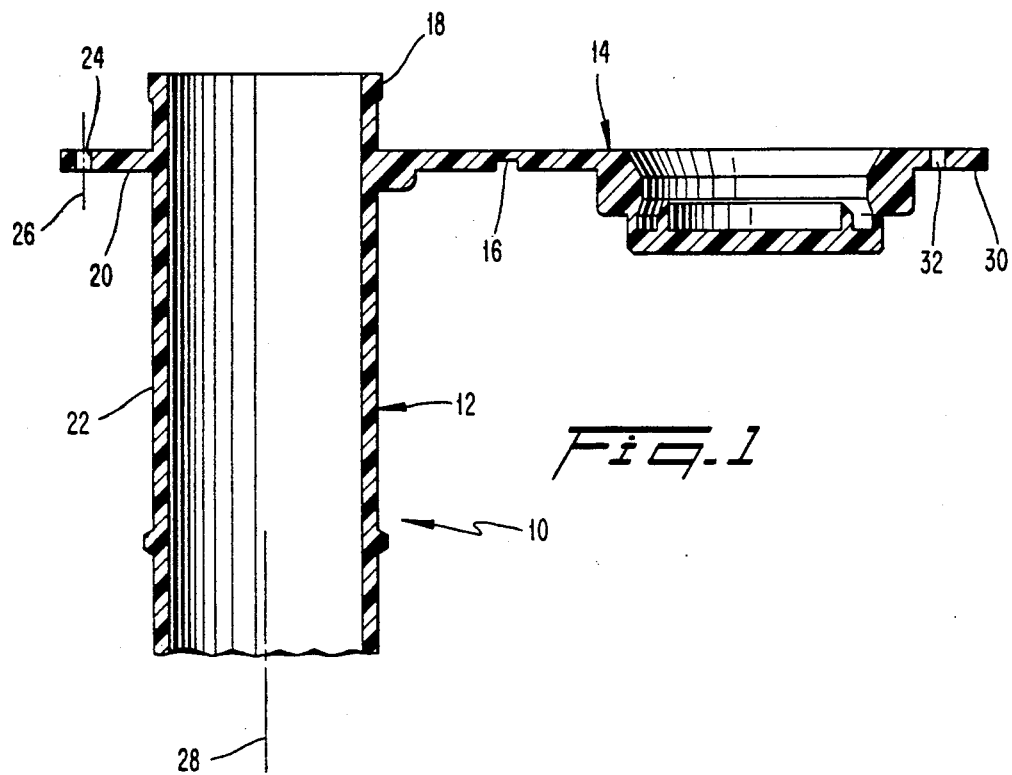
FIG. 1 is a longitudinal sectional view through a plastic vial according to the present invention.
Figure 2:
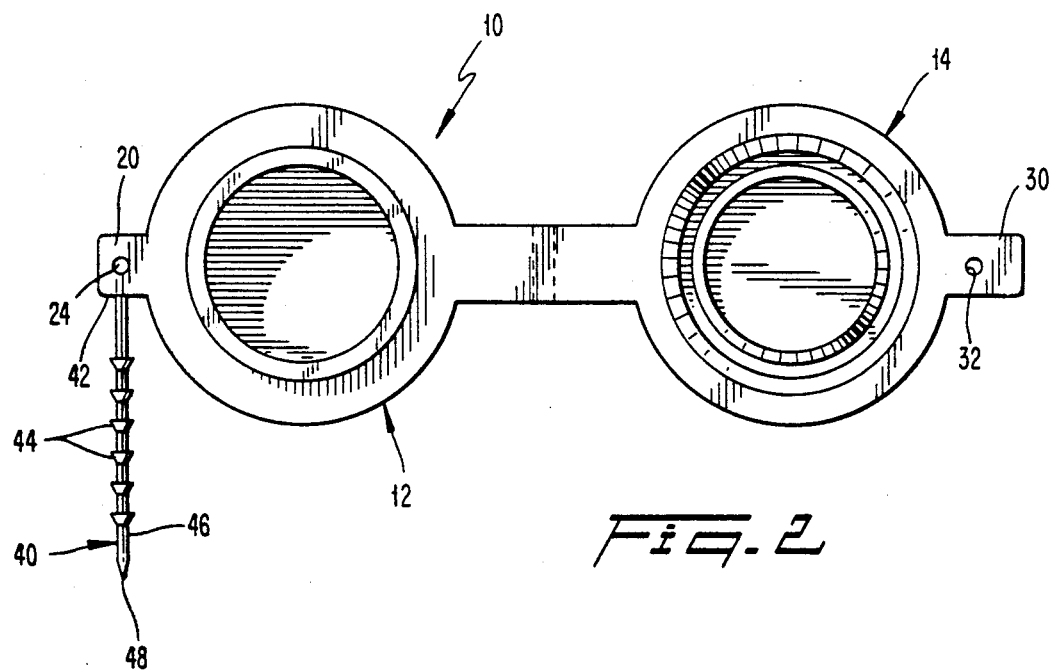
FIG. 2 is a plan view of the vial with the cap unseated from the rim of the container.

A tamper-proof plastic vial 10 comprises a container 12 and a cap 14 which are integrally molded of plastic. The cap and vial may be molded according to the process and mold disclosed in U.S. Pat. Nos. 4,783,056 and 4,812,116, respectively. With such a process and mold, the entire vial, including the cap, container, and tamper-proof seal (to be described below) can be molded in a single operation. The disclosures of those patents are incorporated by reference herein.

The cap 14 is joined to the container by an integral hinge 16 about which the cap may swing between open and closed positions. In a closed position, the cap is press-fit to a rim 18 of the container 12.

The container 12 includes an integral flange 20 projecting radially outwardly from an outer surface 22 of the container at a location adjacent the rim 18. The flange 20 possesses a through-hole 24, the axis 26 of which is disposed generally parallel to a longitudinal axis 28 of the container 12.

The cap 14 possesses a radially outwardly projecting flange 30 which includes a through-hole 32. The cap flange 30 is arranged to overlie and substantially seat upon the container flange 20 when the cap 14 is closed, whereby the through-holes 32, 24 become substantially coaxially aligned. However, slight misalignment of the through-holes will not detrimentally affect the function of the present invention. Preferably, the cap flange 30 is of such a length as to extend past the container flange 20 and thereby define a thumb tab 35 which facilitates opening of the cap 14.

In order to ensure that once the container has been filled with a sample or specimen the cap 14 cannot be removed without creating visual evidence of such removal, there is provided a destructible string seal in the form of a locking strip 40. The strip, which is integrally molded with an edge 42 of the container flange 20, includes a pointed shank 46 and a plurality of one-way teeth or flexible projections 42 which are configured to pass through the through-holes 32, 24 in one direction only. The teeth are preferably of conical shape and spaced along a cylindrical shank 46 of the strip. Alternatively, the teeth could be of any other suitable wedge-like shape. Various embodiments of locking strips have been proposed that are suitable for use with the container of the present invention.

Figure 3:
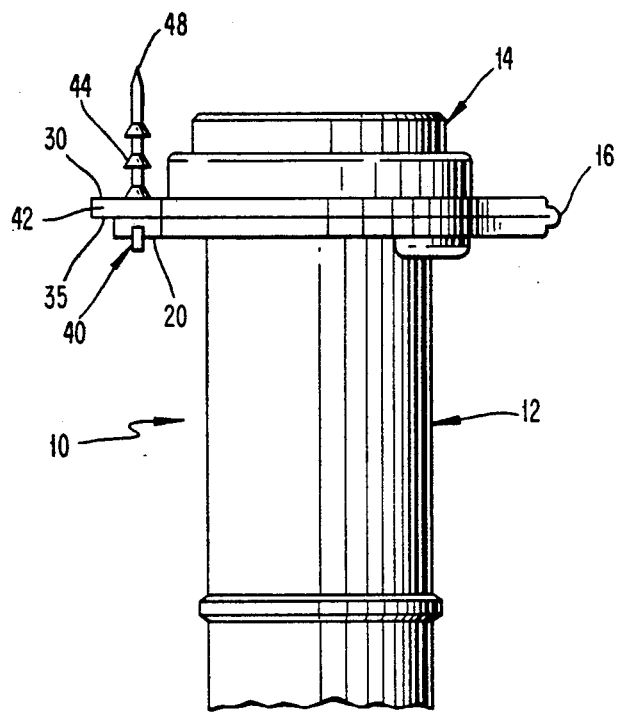
FIG. 3 is a side elevational view of the vial after the cap has been seated onto the container rim, and a locking strip has been inserted through aligned holes in a container flange and a cap flange.

The strip 40 is of sufficient flexibility and length to pass through the aligned holes 24, 32 while remaining joined to the flange 20 (see FIG. 3). Thus, once the cap 14 has been seated upon the rim of the container 12, a pointed free end 48 of the strip is inserted into either of the through-holes 24, 32 (e.g., upwardly into the through-hole 24 as depicted when the strip 40 is attached to the container flange 20), and then pulled through both through-holes, whereupon some or all of the teeth squeeze through the through-holes, due to the elastic nature of the plastic material. Once pulled through, the teeth cannot pass back through the through-holes without being permanently destroyed. Accordingly, evidence of any subsequent tampering of the container contents can be visibly detected. In order to test the sample or specimen in the container, it is necessary to cut the strip 40.

It will be appreciated that it is not possible to replace the locking strip once it has been destroyed, since the locking strip is formed integrally with the container. Hence, it is not possible to defeat the tamper-proof capabilities of the invention by replacing an original string seal with a replacement string seal as is possible in connection with prior art devices in which the string seal is separate from both the container and the cap. Furthermore, it is not necessary for a user to carry a supply of strips since the integrally molded strip will always be available with the vial 10. The integral molding of the strip with the vial can be easily and inexpensively performed.

The locking strip not only provides a tamper-proof function, but also aids in preventing dislodgement of the cap during transport, since the strip is able to clamp the flanges tightly together. Thus, additional security against spillage of the container contents is provided.

It will be appreciated that the locking strip need not be molded integrally with the container, but could instead be integrally molded with the cap. In such a case, the locking strip would preferably be inserted first through the through-hole in the cap flange and pulled downwardly through the through-hole in the container flange. This arrangement leaves the string seal strip along the body of the container and may minimize interference by the strip during transport. Furthermore, if the cap were formed separately of the container, i.e., if no integral hinge 16 is provided, there could be provided an additional set of flanges and locking strip located diametrically opposite the first set to provide securement against unauthorized removal of the cap. Moreover, other arrangements of the flanges or equivalent structure could effectively accomplish the objects of the present invention. e.g, multiple through-holes or multiple flanges. An important element is the tamper-evident securement of the locking strip to one of the container or cap.

Figure 4:
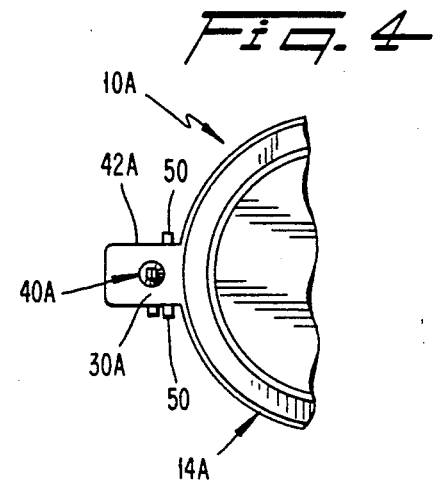
FIG. 4 is a fragmentary plan view of a modified vial according to the present invention with the cap in a closed condition.
Figure 5:
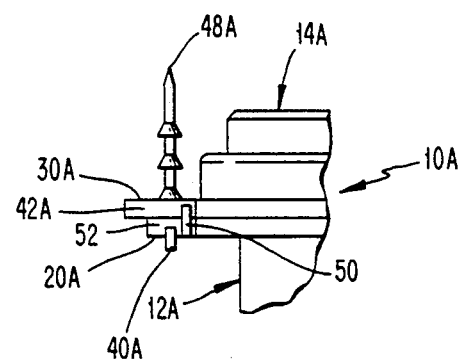
FIG. 5 is a fragmentary side elevational view of the modified container depicted in FIG. 4.

A further embodiment of the invention is depicted in FIGS. 4 and 5, wherein the reference numerals of corresponding elements of the vial are provided with a suffix "A". In this embodiment, the container flange 20A is provided with two integrally molded posts 50 which are upstanding from peripheral edges 52 of the container flange. Those posts 50 straddle the edges 42A of the cap flange 30A when the cap is inserted onto the container rim, so as to prevent relative lateral movement between the flanges in response to lateral impacts. That is, the posts oppose impacts directed laterally relative to the axis of the hole 24A which could produce relative lateral movement between the flanges. Such lateral movement could, in turn, lead to a shearing of the strip and/or an opening of the cap. In order to provide additional security as to the origin of the example or specimen in the vial, the posts 50 can be spot welded in a known manner to the cap flange 30A after the cap has been closed.

Figure 6:
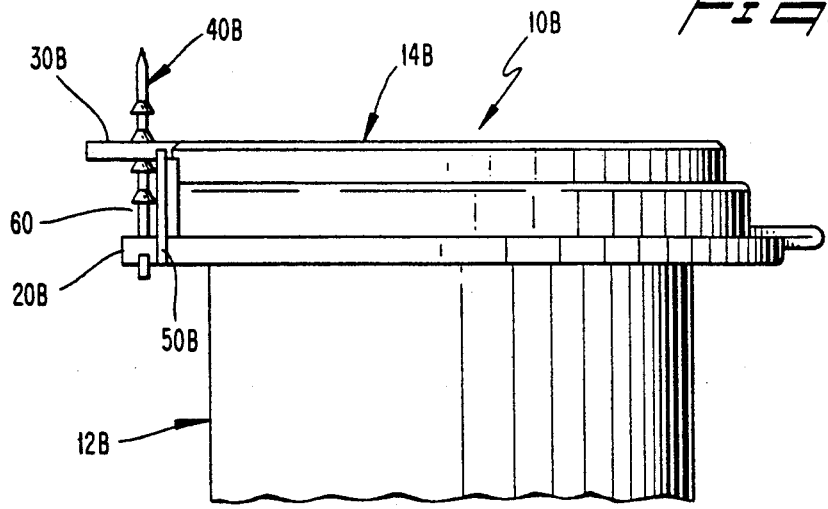
FIG. 6 is a side elevational view of an upper portion of a vial in accordance with a further modification of the invention.

An additional preferred embodiment of the invention is depicted in FIG. 6, wherein the reference numerals of corresponding elements of the vial are provided with a suffix "B". In this embodiment, the cap flange 30B is positioned adjacent the top of the cap generally in the plane of the upper surfaces of the cap 14B, whereby a space 60 is formed between the cap flange 30B and the container flange 20B after the cap 14B has been inserted onto the container rim. The presence of such a space provides more convenient access to the strip 40B in order to cut the strip when the vial is to be opened. In such an embodiment, the presence of posts 50B is particularly advantageous in order to resist inadvertent opening of the cap in response to the application of lateral impact to the cap flange 30B.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A tamper-proof container and cap, said container including a first flange having a first through-hole, said cap including a second flange having a second through-hole, said second flange arranged to substantially overlie said first flange when said cap is inserted onto a rim of said container, one of said container and cap including an integral strip extending from a location adjacent said through-holes, said strip being of sufficient flexibility and length to enable said strip to be inserted through said through-holes while remaining attached to said one of said container and cap, said strip including portions configured for one-way passage through said through-holes.

2. A tamper-proof container and cap according to claim 1, wherein said one of said container and cap is molded of plastic.

3. A tamper-proof container and cap according to claim 2, wherein said container and cap are integrally molded of said plastic to form an integral hinge therebetween.

4. A tamper-proof container and cap according to claim 1, wherein said strip is integrally formed of one-piece with said container.

5. A tamper-proof container and cap according to claim 1, wherein said strip is integrally formed of one-piece with said cap.

6. A tamper-proof container and cap according to claim 1, wherein said portions comprise teeth of generally conical shape.

7. A tamper-proof container and cap according to claim 1, wherein said strip is integrally formed of one-piece with one of said flanges.

8. A tamper-proof container and cap according to claim 1, wherein one of said flanges includes post means engaging the other flange in a manner opposing relative movement between said flanges in a direction laterally of the axes of said through-holes.

9. A tamper-proof container and cap according to claim 8, wherein said post means comprises a pair of posts engaging respective outer edges of said other flange.

10. A tamper-proof container and cap according to claim 1, wherein one end of said strip projects from an edge of the flange associated with said one of said container and cap.

11. A tamper-proof container and cap according to claim 10, wherein the other end of said strip is pointed.

12. A tamper-proof container and cap according to claim 1, wherein said second flange extends past said first flange when said second flange overlies said first flange, whereby said second flange defines a thumb tab for facilitating opening of said cap.

13. A tamper-proof container and cap according to claim 1, wherein a space is formed between said flanges when said cap is seated on said container to facilitate cutting of said strip.

14. A tamper-proof container and cap according to claim 13, wherein one of said flanges includes post means engaging the other flange in a manner opposing relative movement between said flanges in a direction laterally of the axes of said through-holes.

15. A tamper-proof container according to claim 1, wherein first and second through-holes are aligned when said cap is inserted onto said container rim.

16. A tamper-proof plastic vial comprising a container and a cap of integrally molded one piece construction and including a hinge therebetween, said container including a first flange having a first through-hole, said cap including a second flange arranged to overlie said first flange when said cap is inserted onto a rim of said container, said flange of one of said container and cap including a strip integrally molded in one piece therewith, said strip being sufficiently flexible and of a length sufficient to enable said strip to be inserted through said holes while remaining attached to said last-named flange, said strip including portions configured for one-way passage through said through-holes whereby removal of said strip is possible only by permanent destruction thereof, said second flange defining a thumb tab facilitating opening of said cap.

17. A tamper-proof plastic vial according to claim 16, wherein one of said flanges includes post means being arranged relative to the other flange in a manner opposing relative movement between said flanges in a direction laterally of the axes of said through-holes.

18. A tamper-proof plastic vial according to claim 17, wherein said post means comprises a pair of posts engaging respective outer edges of said other flange.

19. A tamper-proof plastic vial according to claim 17, wherein said post means are secured to said other flange when said cap is closed.

20. A tamper-proof plastic vial according to claim 16, wherein a space is formed between said flanges when said cap is seated on said container to facilitate cutting of said strip.

21. A tamper-proof plastic vial according to claim 20, wherein one of said flanges includes post means being arranged relative to the other flange in a manner opposing relative movement between said flanges in a direction laterally of aligned axes of said through-holes.

22. A tamper-proof container according to claim 16, wherein first and second through-holes are aligned when said cap is inserted onto said container rim.

* * * * *